No. 833,565. PATENTED OCT. 16, 1906.
W. H. VOSS.
STAVE TAPERING MACHINE.
APPLICATION FILED JAN. 30, 1905.
3 SHEETS—SHEET 1.
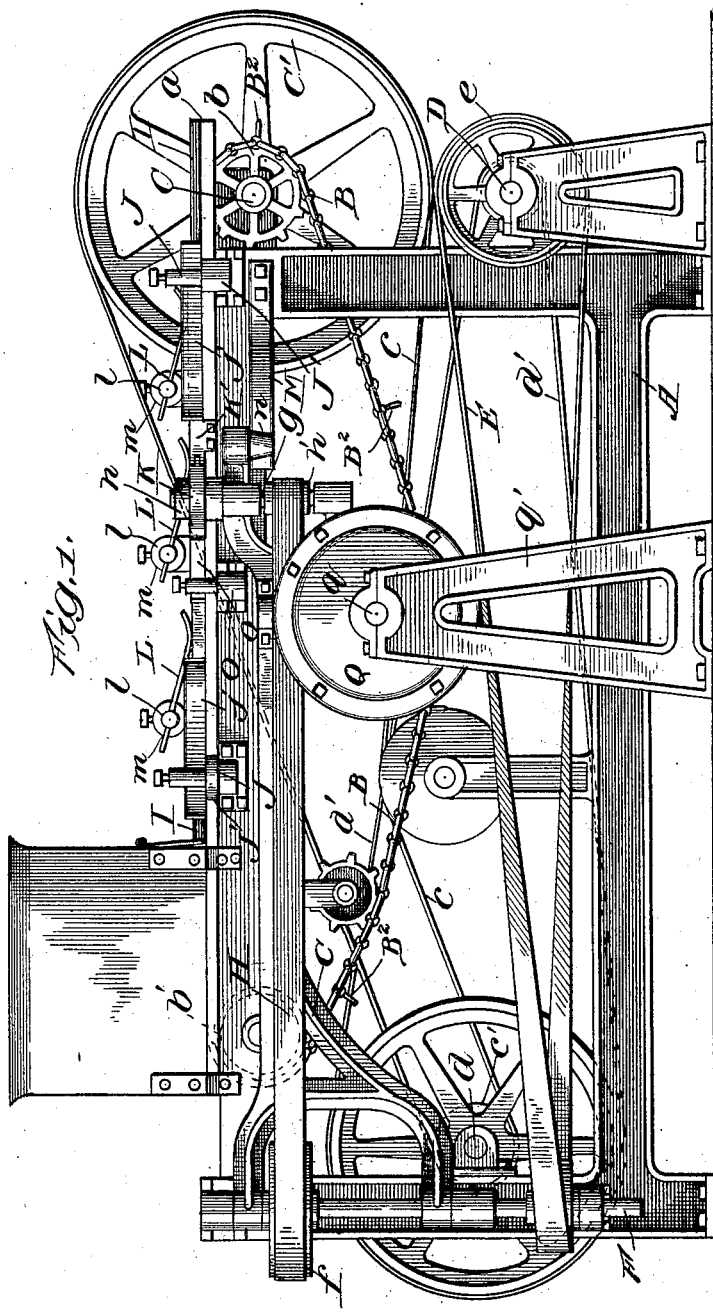
Witnesses:
Inventor
William H. Voss:
By Frank D. Thomason
Atty.

No. 833,565. PATENTED OCT. 16, 1906.
W. H. VOSS.
STAVE TAPERING MACHINE.
APPLICATION FILED JAN. 30, 1905.
3 SHEETS—SHEET 2.
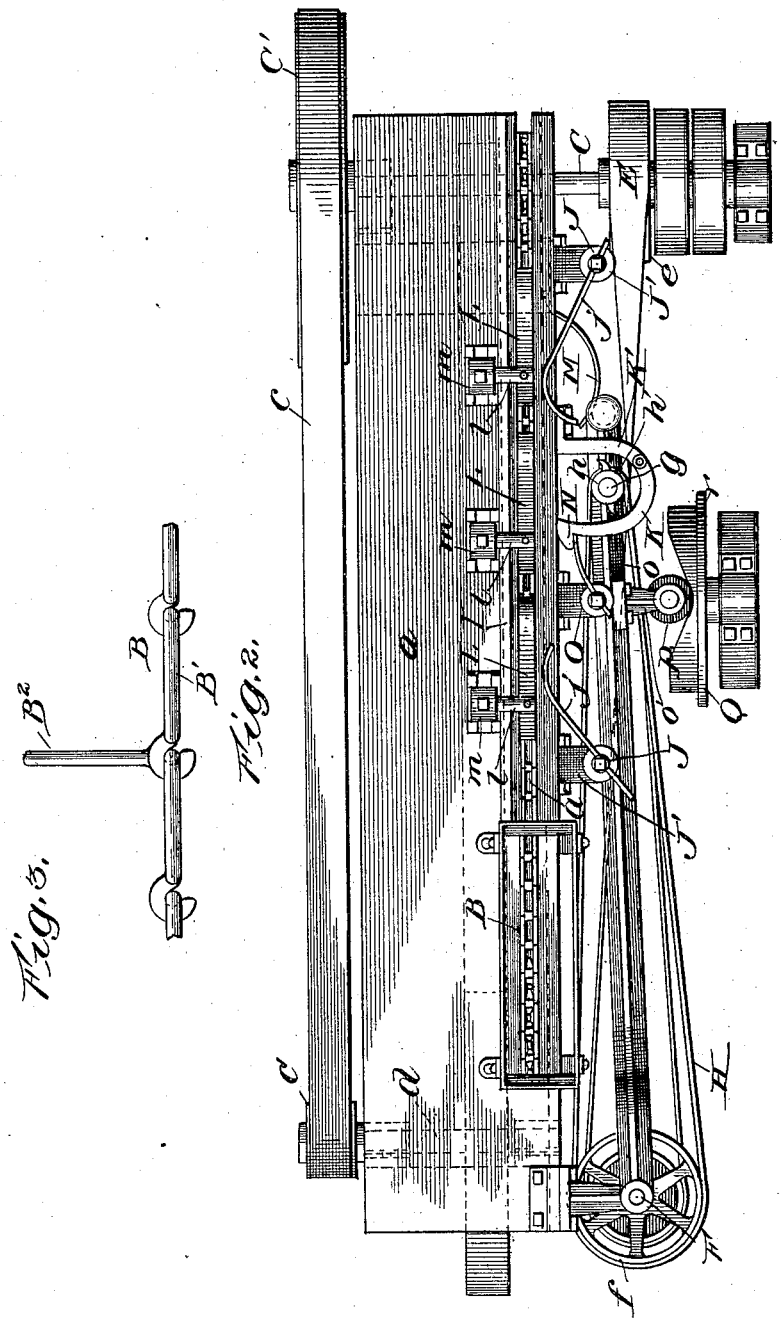
Witnesses:
OM. Henrich
E. R. Lundy.
Inventor.
William H. Voss.
By Frank D. Thomson
Atty.

No. 833,565. PATENTED OCT. 16, 1906.
W. H. VOSS.
STAVE TAPERING MACHINE.
APPLICATION FILED JAN. 30, 1905.

3 SHEETS—SHEET 3.

Witnesses:
O. M. Hemick
E. K. Lundy

Inventor:
William H. Voss
By Frank D. Thomason
Atty.

THE NORRIS PETERS CO., WASHINGTON, D. C.

UNITED STATES PATENT OFFICE.

WILLIAM H. VOSS, OF DAVENPORT, IOWA.

STAVE-TAPERING MACHINE.

No. 833,565.          Specification of Letters Patent.          Patented Oct. 16, 1906.

Application filed January 30, 1905. Serial No. 243,382.

*To all whom it may concern:*

Be it known that I, WILLIAM H. Voss, a citizen of the United States, and a resident of Davenport, in the county of Scott and State of Iowa, have invented certain new and useful Improvements in Stave-Tapering Machines, of which the following is a full, clear, and exact description.

My invention relates to machines for tapering staves, particularly tubs, buckets, firkins, &c.; and the object of my invention is to control the movement of a rotary cutter to and from the work as it moves past the same as to get the exact shape or taper to the stave desired. This I accomplish by the means hereinafter fully described and as particularly pointed out in the claims.

Figure 7:
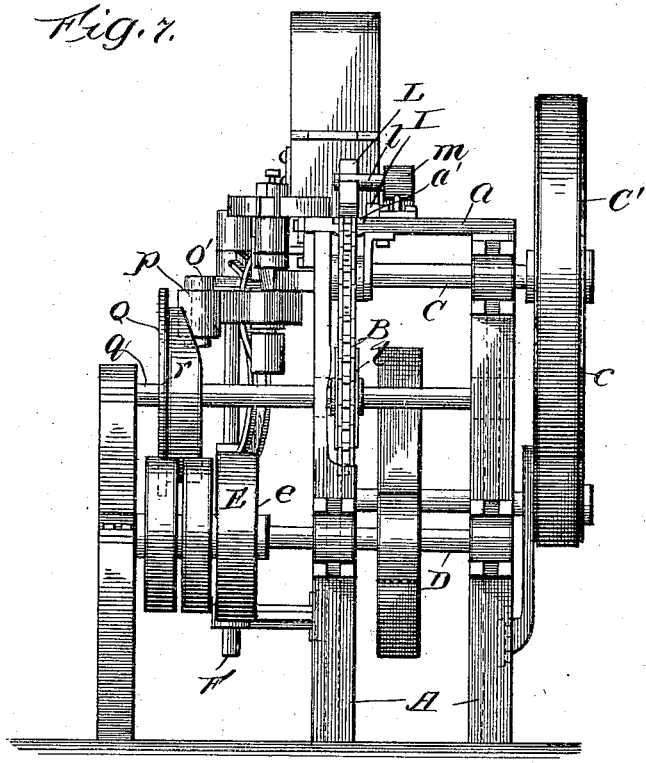
Figure 5:
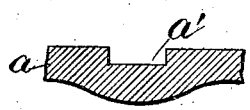
Figure 6:
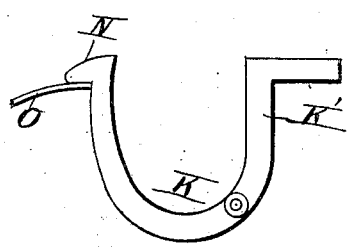
Figure 4:
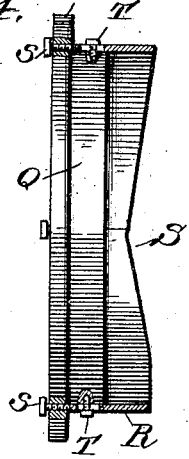

In the drawings, Figure 1 is a side elevation of my invention. Fig. 2 is a plan view of the same. Fig. 3 is a detail view of a section of the detachable link-chain conveyer. Fig. 4 is a detail view showing the cam partly in section. Figs. 5 and 6 are also detail views, the former showing a portion of the bed of the machine in section and the latter a plan of a guard used in connection with the cutter. Fig. 7 is a rear elevation of my invention.

Referring to the drawings, A represents a suitable supporting-frame, the bed $a$ of which, near to and parallel with one of its longitudinal edges, is provided with a longitudinal channel or runway $a'$ for the upper stretch of an endless detachable link-chain conveyer B to move in. This conveyer passes around and connects sprocket-wheels $b\ b'$, one of which, $b'$, is mounted on a short horizontal shaft journaled in suitable bearings in the upper rails of the supporting-frame, the other of which, $b$, is mounted upon a shaft C, journaled in suitable bearings located on the overhanging end of the bed farthest from the sprocket $b'$. One end of this shaft C extends beyond its bearings and is provided with a large pulley C′, that is connected by a suitable belt $c$ to and derives motion from a small pulley $c'$, secured on the adjacent end of a shaft $d$. Shaft $d$ is provided with a large pulley which is connected by a suitable belt $d'$ to and derives motion from a small pulley on a drive-shaft D, which latter is journaled in suitable bearings, preferably below and in the same plane as shaft C. The end of the drive-shaft D extends through its bearings on the side of the supporting-frame opposite the side on which the pulley C′ is located and is provided with a suitable pulley $e$, which is connected, by means of a suitable twisted belt E, to a suitable pulley on a vertical spindle F, journaled in bearings secured to the side of the machine adjacent to the end of the same farthest from the drive-shaft. This spindle F has the legs or bifurcations of the adjacent end of a long arm or beam pivotally mounted thereon, and said beam has bearings in the bifurcations of its opposite free end for the vertically-disposed spindle $g$, to the upper end of which the cutter $h$ is secured. Between its bearings said spindle $g$ is provided with a small pulley $h'$, that is connected by a suitable belt H to and derives motion from a larger pulley $f$, securely mounted on the spindle F near its upper end.

The conveyer-chain B has lugs B² projecting from links B′ thereof, which are located at stated intervals apart, which are adapted when the machine is in operation to engage the ends of the staves fed to the machine and push them longitudinally to and past the cutter $h$. In order to control the course of the staves from the point where the lugs B² of the conveyer first engage the same to the opposite end of the machine, I have provided the bed $a$ with a longitudinally-disposed gage-bar I, which extends coterminous with and parallel to the runway $a'$ next the side thereof farthest from the cutter. While moving over the bed of the machine one longitudinal edge of the stave is kept bearing against the gage-bar I by means of the pressure of several crook-shaped leaf-springs $j$, whose straight end portion is removably fastened in a vertically-disposed stud J arising from a bracket J′, that projects transversely from the upper side rails of the supporting-frame of the machine. In addition to the lateral pressure exerted by these springs a guard K, which partly encircles the cutter $h$, has a presser-foot N on its movable end which exerts a side pressure on the staves as they one at a time pass the cutter and keeps them true to their course and prevents their being drawn into the cutter.

The staves are held upon the bed and prevented from flying up off of the same by means of a series of downwardly-pressing equidistant leaf-springs L, which are constructed similar to the springs $j$, except that they are arranged so that one end thereof will bear down on the stave. The straight end of each of these springs L is suitably secured in a transverse arm $l$, projecting from the end of suitable cylindrical-shaped holders, which latter have screw-plates m, which are secured to the bed, preferably on the side of the gage-bar farthest from the conveyer.

The stave-blanks are usually of such width that the edges thereof engaged by the cutter project beyond and overhang the adjacent side edge of the bed of the machine, and when said staves engage the guard K said guard is forced laterally to permit the passage of the stave. To accomplish this result, the guard is made of a curved bar of metal which is curved so as to partly surround said cutter and has its outer end pivotally connected to the extremity of a stationary bracket K', secured to and projecting laterally from the side of the machine. The presser-foot N consists of a lobe that projects from the extremity of the guard toward the approach of the staves and has the edge thereof with which the side of the stave comes in contact tapered so that the stave as it comes in contact with the same forces the guard outward. This outer movement of said guard is resisted, and after the stave has passed it the return of said guard to its original position is effected by a leaf-spring o, one end of which bears against the shoulder or back of the presser-foot and the other end secured in a vertically-disposed stud projecting from the outer end of a transverse bracket O, secured to and projecting from the side of the supporting-frame.

The operation of my improved machine is such that as the stave moves into engagement with the cutter the latter will be farthest from the adjacent side of the supporting-frame, and as the stave continues its movement past the cutter the latter gradually moves toward the adjacent edge of the bed of the machine until the stave has passed by it, and thus tapers the stave. The beam, in the end of which the cutter-spindle is journaled, is normally kept at the limit of its movement away from the adjacent edge of the bed of the machine by means of a longitudinally-disposed strong leaf-spring M, one end of which is secured to the supporting-frame and the other bearing out against the downwardly-projecting lug on the end of an extension n of the upper bifurcation of the adjacent end of the beam, and the beam is moved inward, so that the cutter will taper the passing stave by means of a face-cam which operates upon a friction-wheel p, which is journaled in the end of a laterally-projecting arm o', which is secured to the beam, substantially as shown in Fig. 2 of the drawings. This face-cam consists of a suitable wheel Q, which is mounted on a transverse shaft q, located in the same vertical plane below the axis of the wheel p and suitably journaled in bearings in the opposite side of the supporting-frame and in a suitable standard q'. The outer edge of wheel Q is provided with an outwardly-projecting flange r, and the perimeter of the wheel has a cylindrical band R surrounding it, one edge of which abuts against said flange r and the opposite edge of which extends beyond and overhangs the side of the wheel Q nearest the beam and is provided with, say, two symmetrical and oppositely-disposed corrugations or cam-surfaces S, against which wheel p bears. The band R is secured to the perimeter of wheel Q by means of screws s s, which pass through transversely-slotted openings therein, and said band is adjustable transversely within the limits of said slotted openings by means of set-screws T, tapped transversely through the base of flange r. Shaft q is driven by means of the endless detachable link-chain conveyer B, whose lower stretch engages a suitable sprocket-wheel t on said shaft and causes the cam-band to travel at about the same speed as the conveyer.

What I claim as new is—

1. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a cam engaging said bracket for moving the free end of said beam toward and from the line of travel on the stave, and means mounted on the pivotal shaft of said beam for transmitting motion to said cutter.

2. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a face-cam engaging said bracket for moving the free end of said beam toward and from the line of travel of the stave; and means mounted on the pivotal shaft of said beam for transmitting motion to said cutter.

3. A stave-tapering machine comprising a suitable bed; means for conveying staves longitudinally therethrough; a horizontally-disposed beam pivoted at one end of said bed and extending along one side thereof; a laterally-projecting bracket near the free end of said beam; a cam engaging said bracket for moving the free end of said beam toward and from the line of travel of the stave; a spring for keeping said bracket in engagement with said cam; a rotary cutter journaled in the oscillating end of said beam; and means mounted on the pivotal shaft of the beam for transmitting motion to said cutter.

4. A stave-tapering machine comprising a suitable bed; means for conveying staves longitudinally therethrough; a beam pivoted at one end of said bed and extending along one side thereof; a cutter the axis of which is vertically disposed and which is journaled in the free end of said beam; a laterally-projecting bracket on the end of said beam adjacent to said cutter; a guard for said cutter; cam-actuated means engaging said bracket for moving the free end of said beam toward and from the line of travel of the stave; and means mounted on the pivotal shaft of said beam for transmitting motion to said cutter.

5. A stave-tapering machine comprising a suitable bed; means for conveying staves longitudinally therethrough; a beam pivoted at one end of said bed and extending along one side thereof; a cutter the axis of which is vertically disposed and which is journaled in the free end of said beam; a laterally-projecting bracket on the end of said beam adjacent to said cutter; an automatically-returnable guard for said cutter; cam-actuated means engaging said bracket for moving the free end of said beam toward and from the line of travel of the stave; and means mounted on the pivotal shaft of said beam for transmitting motion to said cutter.

6. A stave-tapering machine comprising a suitable bed; means for conveying staves longitudinally therethrough; a beam pivoted at one end of said bed and extending along one side thereof, a cutter the axis of which is vertically disposed and which is journaled in the free end of said beam; a laterally-projecting bracket on the end of said beam adjacent to said cutter; a jointed guard for said cutter; cam-actuated means engaging said bracket for moving the free end of said beam toward and from the line of travel of the stave; and means mounted on the pivotal shaft of said beam for transmitting motion to said cutter.

7. A stave-tapering machine comprising a suitable bed; means for conveying staves longitudinally therethrough; a beam pivoted at one end of said bed and extending along one side thereof; a cutter the axis of which is vertically disposed and which is journaled in the free end of said beam; a laterally-projecting bracket on the end of said beam adjacent to said cutter; a jointed automatically-returnable guard for said cutter; cam-actuated means engaging said bracket for moving the free end of said beam toward and from the line of travel of said stave; and means mounted on the pivotal shaft of said beam for transmitting motion to said cutter.

8. A stave-tapering machine comprising a suitable bed; means for conveying staves longitudinally therethrough; a horizontally-disposed oscillatory beam extending along one side of said bed; a cutter the axis of which is vertically disposed and which is journaled in the free end of said beam; a laterally-projecting bracket on the end of said beam adjacent to said cutter; a guard for said cutter; cam-actuated means engaging said bracket for moving the free end of said beam toward and from the line of travel of the stave; and means mounted on the pivotal shaft of said beam for transmitting motion to said cutter.

9. A stave-tapering machine comprising a suitable bed; means for conveying staves longitudinally therethrough; a horizontally-disposed oscillatory beam extending along one side of said bed; a cutter the axis of which is vertically disposed and which is journaled in the free end of said beam; a laterally-projecting bracket on the end of said beam adjacent to said cutter; cam-actuated means engaging said bracket for moving the free end of said beam toward and from the line of travel of the stave; and means mounted on the pivotal shaft of said beam for transmitting motion to said cutter.

10. A stave-tapering machine comprising a suitable bed; means for conveying staves longitudinally therethrough; a horizontally-disposed oscillatory beam extending along one side of said bed; a cutter the axis of which is vertically disposed and which is journaled in the free end of said beam; a laterally-projecting bracket on the end of said beam adjacent to said cutter; a jointed guard for said cutter; cam-actuated means engaging said bracket for moving the vibratory end of said beam toward and from the line of travel of the stave; and means mounted on the pivotal shaft of said beam for transmitting motion to said cutter.

11. A stave-tapering machine comprising a suitable bed; means for conveying staves longitudinally therethrough; a vertically-disposed oscillatory beam extending along one side of said bed; a cutter the axis of which is vertically disposed and which is journaled in the free end of said beam; a laterally-projecting bracket on the end of said beam adjacent to said cutter; a jointed automatically-returnable guard for said cutter; cam-actuated means engaging said bracket for moving the free end of said beam toward and from the line of travel of the stave; and means mounted on the pivotal shaft of said beam for transmitting motion to said cutter.

12. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a permanently-secured guard for said cutter; a cam engaging said bracket for moving the free end of said beam toward and from the line of travel of the stave; and means mounted on the pivotal shaft of said beam for transmitting motion to said cutter.

13. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a jointed guard for said cutter having one end permanently secured; a cam engaging said bracket for moving the free end of said beam toward and from the line of travel of the stave; and means mounted on the pivotal shaft of said beam for transmitting motion to said cutter.

14. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a jointed guard for said cutter having one end permanently secured and the other end provided with a presser-foot; a cam engaging said bracket for moving the free end of said beam toward and from the line of travel of the stave; and means mounted on the pivotal shaft of said beam for transmitting motion to said cutter.

15. A stave-tapering machine comprising a suitable bed; means for conveying staves longitudinally therethrough; an automatically-returnable horizontally-disposed beam pivoted at one end of said bed and journaled along one side thereof; a cutter the axis of which is vertically disposed and which is journaled in the free end of said beam; a laterally-projecting bracket on the end of said beam adjacent to said cutter; a jointed guard for said cutter having one end permanently secured and its other end free and which is automatically returnable; a cam engaging said bracket for moving the free end of said beam toward and from the line of travel of the stave; and means mounted on the pivotal shaft of said beam for transmitting motion to said cutter.

16. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a jointed guard for said cutter having one end permanently secured and its free end provided with a presser-foot and automatically returnable; a cam engaging said bracket for moving the free end of said beam toward and from the line of travel of said stave; and means mounted on the pivotal shaft of said beam for transmitting motion to said cutter.

17. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; means mounted on the pivotal shaft of said beam for transmitting motion to said cutter; and a cam for moving the free end of said beam toward and from the line of travel of the stave, consisting of a wheel, and a band on the periphery, the overhanging edge of which adjacent to said beam is suitably cammed and engages said bracket.

18. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a permanently-secured guard for said cutter; means on the pivotal shaft of said beam for transmitting motion to said cutter; a cam for moving the free end of said beam toward and from the line of travel of the stave, consisting of a wheel, and a laterally-disposed band on the periphery thereof, the overhanging edge of which adjacent to said beam is suitably cammed and engages said bracket.

19. A stave-tapering machine comprising a suitable bed; means for conveying staves longitudinally therethrough; an automatically-returnable horizontally-disposed beam pivoted at one end of said bed and extending along one side thereof; a cutter the axis of which is vertically disposed and which is journaled in the free end of said beam; a laterally-projecting bracket on the end of said beam adjacent to said cutter; a permanently-secured guard for said cutter; means mounted on the pivotal shaft of said beam for transmitting motion to said cutter; and a cam for moving the free end of said beam toward and from the line of travel of the stave, consisting of a wheel having a circumferential flange, a band on the periphery thereof having transversely-slotted openings therein, the overhanging edge of said band adjacent to said beam being suitably cammed and is engaged by said bracket; screws extending through said openings for securing the band to the wheel, and set-screws tapped through said flange and engaging the edge of said band.

20. A stave-tapering machine comprising a suitable bed, an endless conveyer traversing the same longitudinally for conveying staves therethrough; leaf-springs for retaining the staves while in transit across said bed, a horizontally-disposed beam pivoted at one end to said bed extending along one side thereof; a cutter the axis of which is vertically disposed and which is journaled in the free end of said beam; a laterally-projecting bracket on the end of said beam adjacent to said cutter; a cam engaging said bracket for moving the free end of said beam toward and from the line of travel of said conveyer; and means mounted on the pivotal shaft of said beam for transmitting motion to said cutter.

In testimony whereof I have hereunto set my hand this 24th day of January, A. D. 1905.

WILLIAM H. VOSS.

Witnesses:
WILLIAM E. PULS,
CHAS. E. MEARNS.